(12) United States Patent
Weller et al.

(10) Patent No.: US 8,154,813 B2
(45) Date of Patent: Apr. 10, 2012

(54) EMBEDDED SERVO ON TRACK FOR BIT-PATTERNED DEVICE

(75) Inventors: Dieter Klaus Weller, San Jose, CA (US); Hans Jurgen Richter, Palo Alto, CA (US); David S. Kuo, Palo Alto, CA (US); Kim Yang Lee, Fremont, CA (US)

(73) Assignee: Seagate Technology, LLC, Cupertino, CA (US)

( * ) Notice: Subject to any disclaimer, the term of this patent is extended or adjusted under 35 U.S.C. 154(b) by 432 days.

(21) Appl. No.: 12/202,570

(22) Filed: Sep. 2, 2008

(65) Prior Publication Data
US 2010/0053809 A1 Mar. 4, 2010

(51) Int. Cl.
*G11B 5/02* (2006.01)
*G11B 5/596* (2006.01)
(52) U.S. Cl. .................................... 360/48; 360/77.02
(58) Field of Classification Search .................. None
See application file for complete search history.

(56) References Cited

U.S. PATENT DOCUMENTS

| | | | |
|---|---|---|---|
| 6,086,961 A | 7/2000 | Bonyhard | |
| 7,136,252 B2 * | 11/2006 | Tagami | 360/77.08 |
| 7,339,764 B2 * | 3/2008 | Honda et al. | 360/131 |
| 7,612,961 B2 * | 11/2009 | Yamamoto | 360/48 |
| 7,701,668 B2 * | 4/2010 | Sewell | 360/135 |
| 2008/0137231 A1 * | 6/2008 | Lim et al. | 360/131 |
| 2009/0244765 A1 * | 10/2009 | Albrecht | 360/75 |
| 2010/0002325 A1 * | 1/2010 | Bedillion | 360/29 |

* cited by examiner

*Primary Examiner* — Daniell L Negron
*Assistant Examiner* — Regina N Holder
(74) *Attorney, Agent, or Firm* — Ladas & Parry, LLP (57) ABSTRACT

A method of making a disc for a computer disc drive and a disc made in accordance with the same. The disc includes a deposited magnetic layer of a thin film medium over a disc-shaped substrate. A master pattern having a plurality of tracks is recorded on the disc. Each track on the disc includes a plurality of magnetic islands, each having a size and magnetic properties. The size and/or magnetic properties of one or more of the magnetic islands of each track are modulated such that each track has a modulation frequency, so as to imprint a magnetic topology on the disc. The modulation frequency of each track is either a fundamental frequency or an overtone of the fundamental frequency.

6 Claims, 10 Drawing Sheets

EMBEDDED SERVO ON TRACK FOR BIT-PATTERNED DEVICE

BACKGROUND OF THE INVENTION

The computer industry continually seeks to reduce size of computer components and to increase the speed at which computer components operate. To this end, it is desired to reduce the size required to magnetically record bits of information. It is concomitantly important to maintain the integrity of the information as size is decreased, and magnetic storage of information must be virtually 100% error free. Moreover, the methods used to reduce size, increase speed and maintain information integrity in computer components must be very reproducible in a manufacturing setting and must not be overly costly.

Disc drives which magnetically record, store and retrieve information on disc-shaped media are widely used in the computer industry. A write transducer is used to record information on the disc, and a read transducer is used to retrieve information from the disc. The reading and writing processes may be performed by a single structure, i.e., a read-write transducer, or alternatively may be performed by separate structures. In either case, the read transducer and the write transducer are generally both located on a single magnetic head assembly. The magnetic head assembly may include an air bearing slider which suspends the magnetic head assembly relative to the rotating disc by "flying" off air on the disc surface.

The magnetic head assembly is mounted on the end of a support or actuator arm, which positions the head radially on the disc surface. If the actuator arm is held stationary, the magnetic head assembly will pass over a circular path on the disc known as a track, and information can be read from or written to that track. Each concentric track has a unique radius, and reading and writing information from or to a specific track requires the magnetic head to be located above the track. By moving the actuator arm, the magnetic head assembly is moved radially on the disc surface between tracks.

The disc drive must be able to differentiate between tracks on the disc and to center the magnetic head over any particular track. Most disc drives use embedded "servo patterns" of magnetically recorded information on the disc. Typical servo patterns are described in, for example, U.S. Pat. No. 6,086,961, the disclosure of which is incorporated herein by reference. The servo patterns are read by the magnetic head assembly to inform the disc drive of track location. Tracks typically include both data sectors and servo patterns. Each data sector contains a header followed by a data section. The header may include synchronization information to synchronize various timers in the disc drive to the speed of disc rotation, while the data section is used for recording data.

Each servo pattern typically includes a "gray code" and a "servo burst". The gray code indexes the radial position of the track such as through a track number, and may also provide a circumferential index such as a sector number. The servo burst is a centering pattern to precisely position the head over the center of the track. Each servo burst includes magnetic transitions on the inside of the track interleaved with magnetic transitions on the outside of the track. If the magnetic head is centered over the track, the signal read from the inside transitions will be equal and opposite to the signal read from the outside transitions. If the magnetic head is toward the inside of the track, the signal from the inside transitions will predominate, and vice versa. By comparing portions of the servo burst signal, the disc drive can iteratively adjust the head location until a zeroed position error signal is returned from the servo bursts indicating that the head is properly centered with respect to the track.

Servo patterns are usually written on the disc during manufacture of the disc drive, after the drive is assembled and operational. The servo pattern information, and particularly the track spacing and centering information, needs to be located very precisely on the disc. However, at the time the servo patterns are written, there are no reference locations on the disc surface which can be perceived by the disc drive. Accordingly, a highly specialized device known as a "servo-writer" is used during writing of the servo-patterns. Largely because of the locational precision needed, servo-writers are fairly expensive, and servo-writing is a time consuming process.

Most servo-writers operate using the disc drive's own magnetic head. The servo-writer takes precise positional references to properly position the heads in the disc drive for the writing of the servo patterns, and to properly space the tracks with respect to one another on the disc surface. For instance, the servo writer may have a physical position sensor which takes a positional reference from the axis of the drive spindle, and may have an optical position sensor which determines the location of the magnetic heads with respect to the axis of the drive spindle. With precise positioning of the magnetic head known, the magnetic head of the disc drive is used to write the servo pattern on the disc. The servo writer may also include a magnetic head which writes a clock track at an outer radius of the disc. Once written, servo patterns serve as the positional references on the disc surface used by the disc drive during the entire life of the disc drive. The servo patterns are used to properly center the head over the desired track prior to reading or writing any data information from or to that track.

SUMMARY OF THE INVENTION

In accordance with one aspect of the present invention a method of making a disc for a computer disc drive is provided. The disc is formed by depositing a magnetic layer of a thin film medium over a disc-shaped substrate and recording a master pattern on the disc. The master pattern includes a plurality of tracks, each track having a plurality of magnetic islands having a size and magnetic properties. At least one of the size and the magnetic properties of the plurality of magnetic islands of each track is modulated such that each track has a modulation frequency and the modulation frequency is either a fundamental frequency or an overtone of the fundamental frequency.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the views and in which.

DETAILED DESCRIPTION OF ILLUSTRATIVE EMBODIMENTS

The present invention relates generally to data storage devices, and more particularly but not by limitation to disk media having patterned magnetic islands pre-located on the disk for improved tracking.

Figure 1:
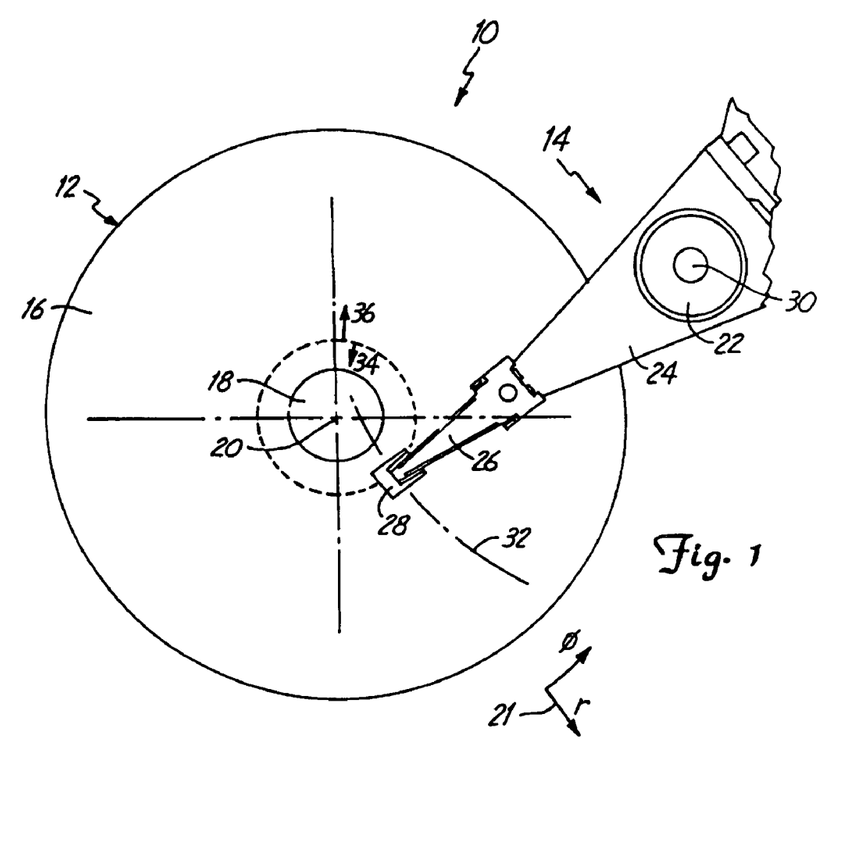
FIG. 1 is a top plan view of a computer disc drive.
Figure 2:
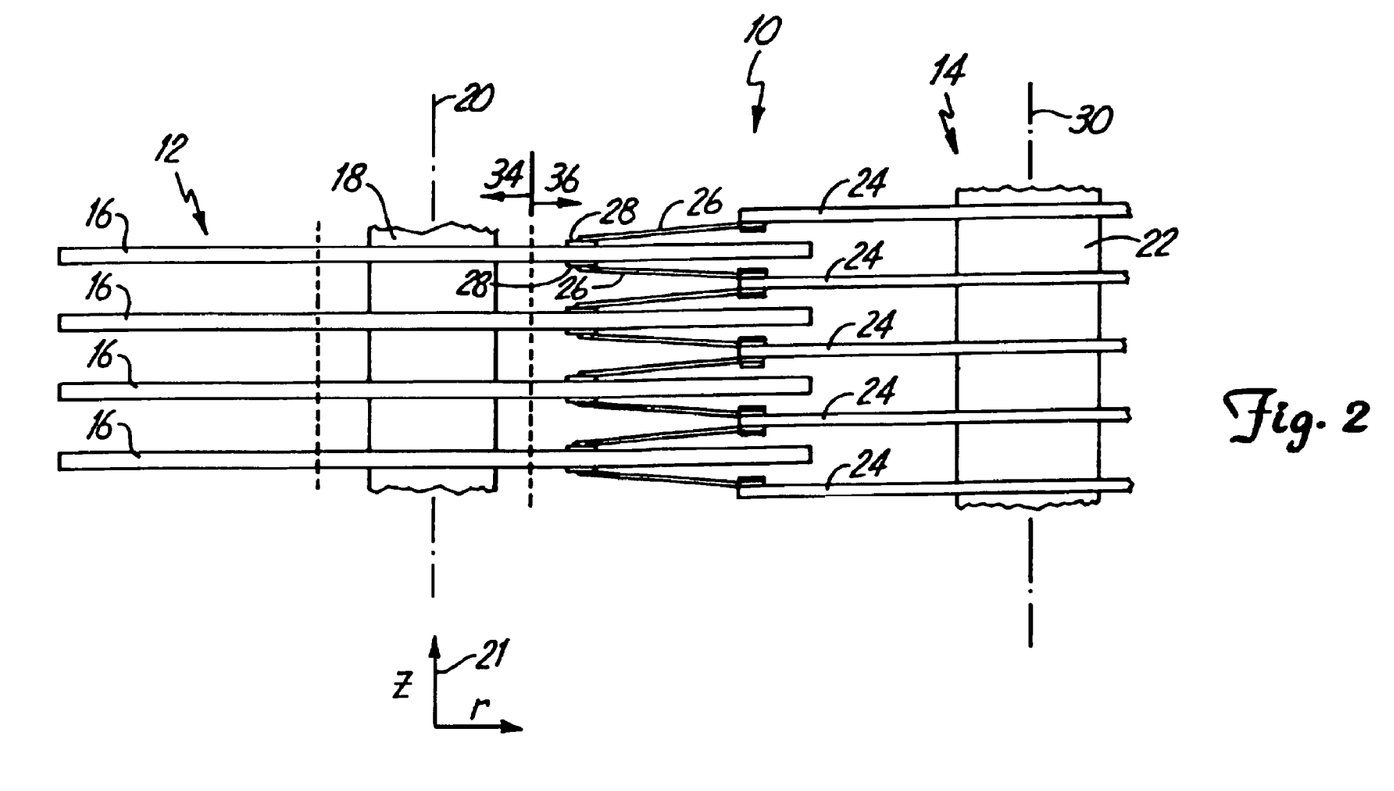
FIG. 2 is a side view of the computer disc drive of FIG. 1.

FIGS. 1 and 2 represent a disc drive structure 10. Disc drive assembly 10 includes disc pack 12 and E-block assembly 14. Disc pack 12 includes discs 16 stacked on drive spindle 18. During use of the disc drive 10, drive spindle 18 rotates discs 16 about axis 20. Polar coordinates 21 are established based on the geometry of disc 16, with the perpendicular distance from axis 20 to any location on disc 16 being a radius r, the circumferential dimension being THETA., and the axial dimension being z.

E-block assembly 14 includes servo spindle 22 and a plurality of actuator arms 24. Each actuator arm 24 carries one or two flexure arms or suspension arms 26. Each suspension arm 26 supports an air bearing magnetic head assembly 28 adjacent a surface of a disc 16. As disc 16 rotates about drive spindle 18 at a high speed (such as 10 m/s or higher) relative to magnetic head assembly 28, the aerodynamic properties of magnetic head assembly 28 cause assembly 28 to "fly" above the surface of disc 16. The flying height of magnetic head assembly 28 above disc 16 is a function of the speed of rotation of disc 16, the aerodynamic lift of the slider of magnetic head assembly 28, and the spring tension in suspension arm 26.

E-block assembly 14 is pivotable about pivot axis 30. As E-block assembly 14 pivots, each magnetic head assembly 28 mounted at the tip of its suspension arm 26 swings through arc 32. As each disc 16 rotates beneath its respective magnetic head assembly 28, this pivoting motion allows the magnetic head assembly 28 to change track positions on its disc 16. Each disc 16 has a landing zone 34 where the magnetic head assembly 28 lands, rests while the disc drive 10 is off, and takes off from when the disc drive 10 is started up. Each disc 16 has a data zone 36 where the magnetic head assembly 28 flies over the disc 16 and magnetically stores data.

To record information on the disc 16, the write transducer on magnetic head assembly 28 creates a highly concentrated magnetic field. During writing, the strength of the concentrated magnetic field directly under the write transducer is greater than the coercivity of the recording medium (known as "saturating" the medium), and grains of the recording medium at that location are magnetized with a direction which matches the direction of the applied magnetic field. The grains of the recording medium retain their magnetization after the saturating magnetic field is removed. As the disc 16 rotates, the direction of the writing magnetic field is alternated based on bits of the information being stored, thereby recording a magnetic pattern on the track directly under the write transducer.

Figure 3:
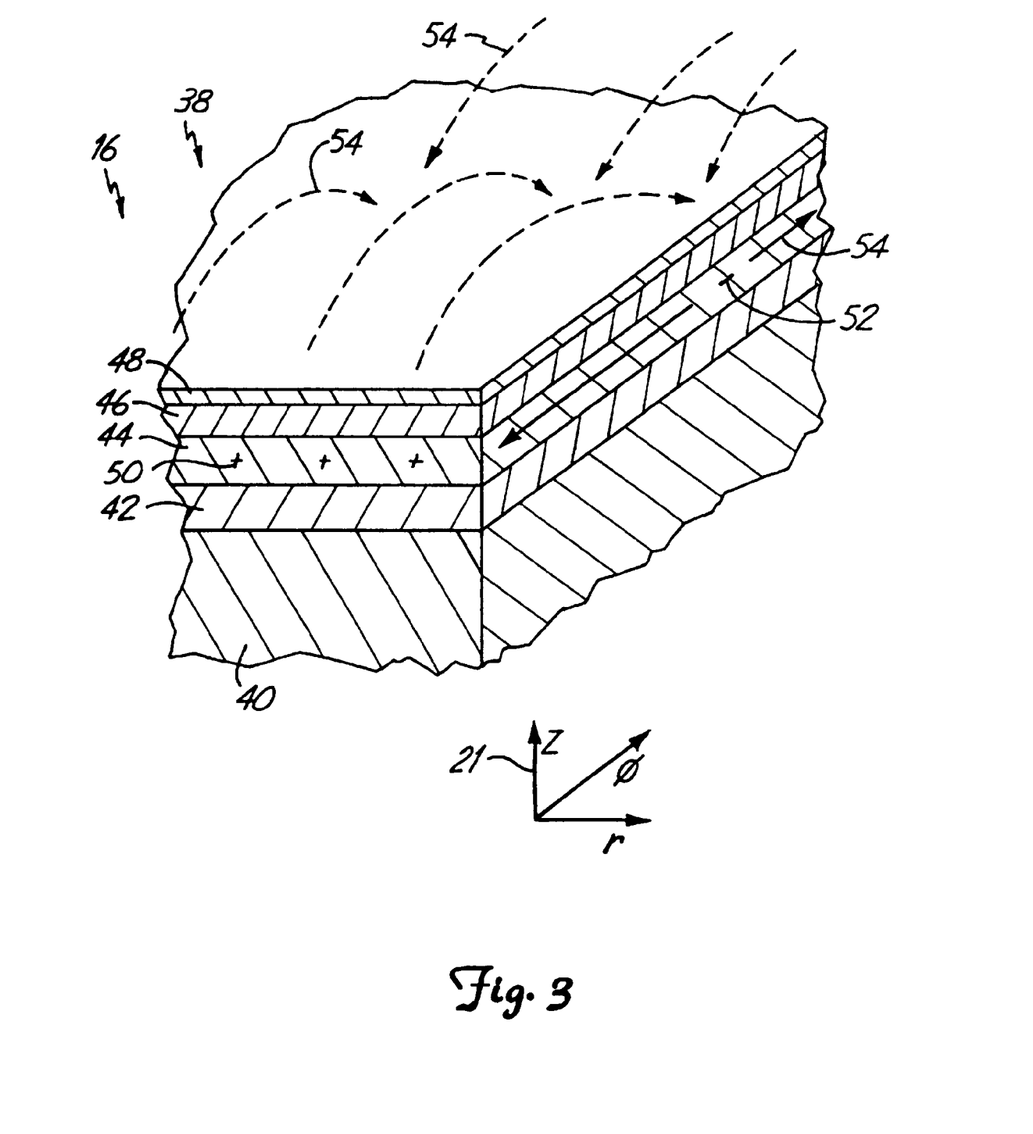
FIG. 3 is a greatly enlarged, cross-sectional perspective view of a portion of the thin film magnetic disc of FIG. 1, schematically showing magnetic flux.

A magnetic medium 38 for disc 16 is illustrated in more detail in FIG. 3. Magnetic medium 38 has a substrate 40 and an underlayer 42 deposited over the substrate 40. Substrate 40 is preferably a nickel-phosphorous plated aluminum disc. Substrate 40 is relatively thick, such as about 0.1 inches, and provides the structural integrity for magnetic medium 38. Other materials, such as glass or manganese-oxide, may also be suitable for substrate 40.

Underlayer 42 is formed of a non-magnetic material, such as chromium or nickel-aluminum. Underlayer 44 is preferably 200 to 500 Angstroms thick. Underlayer 42 sets up a seeding crystallographic structure for proper crystal development in magnetic layer 44. Underlayer 42 may be applied over substrate 40 by sputtering, and various sputter chamber parameters may contribute to the effectiveness of underlayer 42. Other materials such as Mo, W, Ti, NiP, CrV and Cr alloyed with other substitutional elements have also been tried for underlayers, and workers skilled in the art will appreciate that any one of these types of underlayers may be found equivalently beneficial in applying the process of the present invention.

Magnetic layer 44 of a magnetic material is applied over underlayer 42. Magnetic layer 44 is preferably formed of a cobalt-based alloy, such as a cobalt-chromium-tantalum alloy. The preferred cobalt-based magnetic layer 44 has a hexagonal close pack (HCP) crystal structure. Workers skilled in the art will appreciate that other types of magnetic layers may be equivalently used in practicing the present invention.

Magnetic layer 44 is preferably 100 to 300 Angstroms thick. Magnetic layer 44 may be applied over underlayer 42 by sputtering, and various sputter chamber parameters may contribute to the effectiveness of magnetic layer 18.

To enhance the durability of the disc 16, overcoat 46 is deposited over magnetic layer 44. Overcoat 46 helps reduce wear of magnetic media 36 due to contact with the magnetic read-write head assembly 28. Overcoat 46 also aids in corrosion resistance for the magnetic media 38. Overcoat 46 preferably is a layer of sputtered amorphous carbon. Other materials which may be suitable for overcoat 46 include sputtered ceramic zirconium oxide and amorphous films of silicon dioxide. Overcoat 46 can be about 100 to 150 Angstroms thick, with a preferred thickness of about 120 Angstroms. Any of the substrate 40, the underlayer 42 or the overcoat 46 may be textured as desired for beneficially affecting the tribology of the particular disc drive system 10.

A lubricant layer 48 overlies overcoat 46. Lubricant layer 48 also reduces wear and corrosion of the magnetic media 38. The lubricant 48 is preferably a perfluoropolyether-based (PFPE) lubricant having a thickness of 10 to 20 Angstroms. Overcoat 46 and lubricant 48, while not performing a magnetic function, greatly affect the tribology and wear and corrosion resistance in the disc drive system 10.

Magnetic layer 44, as originally deposited, is homogeneous in both the radial and circumferential directions, and carries no magnetic charge. After deposition of magnetic layer 44, information is magnetically written on magnetic layer 44 as represented by + and − magnetization signs 50, 52. In FIG. 3, multiple+ and − magnetization signs 50, 52 and multiple magnetic flux arrows 54 are shown to indicate the direction of aligned magnetic domains and to indicate that numerous aligned domains contribute to each magnetic transition. The writing of the magnetic information occurs after disc 16 is fully fabricated including deposition of overcoat 46 and lubricant 48. The magnetization is believed to be made up of numerous aligned magnetic domains in the structure of magnetic layer 44. Data is then read from magnetic medium 38 by sensing the alternating direction of magnetization, that is, transition locations where the direction of aligned magnetic domains reverses.

Figure 4:
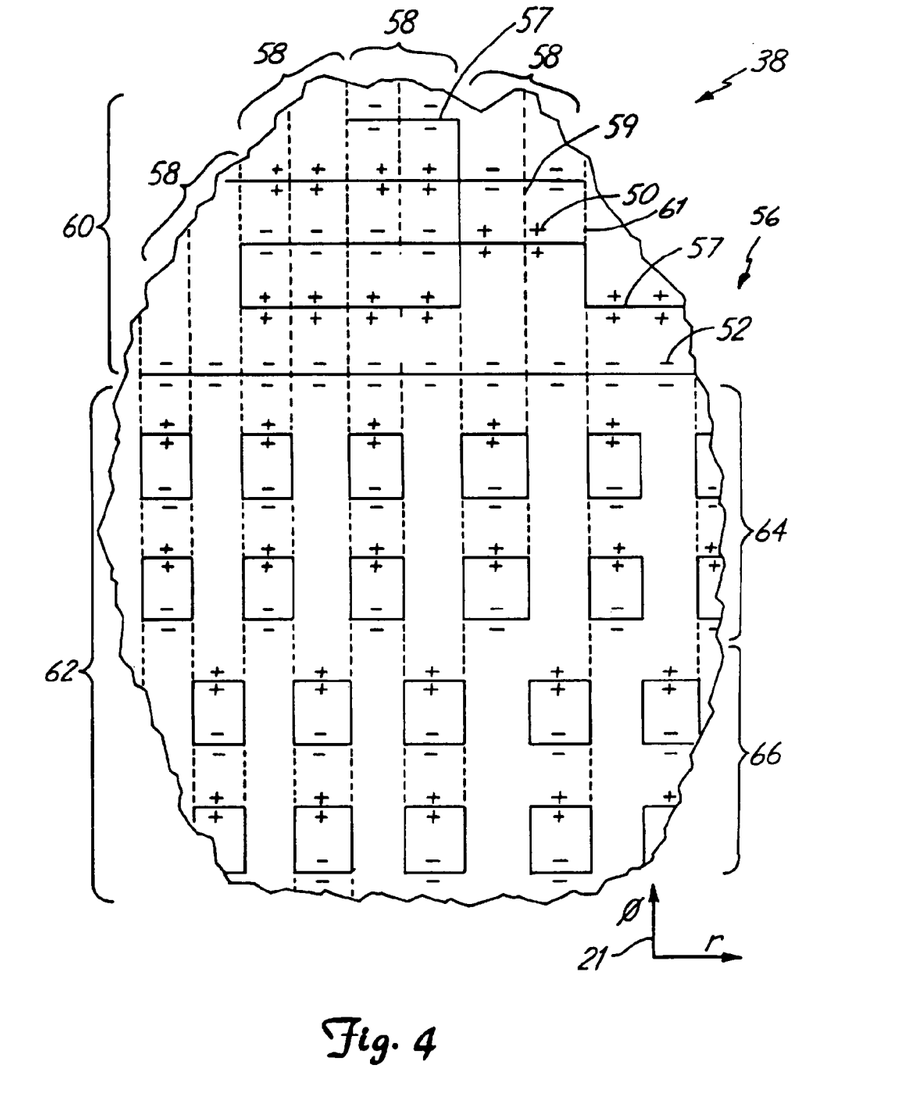
FIG. 4 is a greatly enlarged top plan view of a servo pattern portion of the thin film magnetic disc of FIG. 1, schematically showing magnetic flux.

FIG. 4 schematically shows an areal portion of servo-pattern information 56 magnetically recorded on disc 16. Magnetization signs 50, 52 indicate the direction of magnetization from the aligned magnetic domains (i.e., "dots"). In FIG. 4, transition boundaries 57 between areas of opposite magnetic domain alignment are shown in solid lines. The boundaries 61 of each track 58 are shown in small dashed lines, and a center line 59 of each track 58 is shown in larger dashed lines. The boundaries 61 of each track 58 and the center lines 59 are not recognizable by any physical properties of the magnetic medium 38, but are shown for conceptual purposes only. During use of the disc drive 10, the magnetic head assembly 28 is intended to be centered over a track 58 so the magnetic head assembly will accurately write information to and read information from that track 58. In contrast to track boundaries 61 and center lines 59, each transition boundary 57 is magnetically sensed by the magnetic head assembly 28 when it passes over the transition boundary 57.

In the servo-patterns 56, substantially all of the magnetic domains (i.e., dots) in magnetic medium 38 are aligned in one direction or the other. While transition boundaries 57 are shown in FIG. 4 as sharply defined areas, the true magnetic pattern may not have sharp transitions between opposite directions of magnetization. The sharpness of the transition boundaries on a recording medium is one of the basic parameters in determining the density of the information which can be stored on the recording medium.

Servo pattern information 56 is magnetically written on magnetic medium 38 during manufacture of the disc drive 10. Each servo pattern includes gray code information 60 and a servo burst 62. Gray code information 60 contains indexing information to index each track 58 of the disc 16. Each servo burst 62 includes a plurality of inside transitions 64. Each servo burst 62 also includes a plurality of outside transitions 66. Inside transitions 64 and outside transitions 66 are precisely located on the disc 16 in the radial direction to define the centerline 59 of each track 58, and to maintain very consistent spacing between tracks 58.

During use of the disc drive 10, inside transitions 64 and outside transitions 66 are used to center the magnetic head 28 over a track 58. The signal read from servo bursts 62 depends on the radial position of the magnetic head 28 with respect to the centerline 59 of a track 58. If the magnetic head 28 is centered over the track 58, the signal read from the inside transitions 64 will be equal to the signal read from the outside transitions 66. If the magnetic head 28 is toward the inside of the track 58, the signal from the inside transitions 64 will be stronger than the signal from the outside transitions 66. If the magnetic head 28 is toward the outside of the track 58, the signal from the outside transitions 66 will be stronger. By comparing portions of the servo burst 62 signal, the disc drive 10 can iteratively adjust the head 28 location until a zeroed position error signal is returned from the servo bursts 62, indicating that the head 28 is properly centered with respect to the track 58.

Traditionally, the servo patterns 56 are written on the magnetic medium 38 during manufacture with a servo writer. Writing of the magnetic signals requires two precisely positioned passes of the magnetic head 28 over each track 58: one for the inside transitions 64 and one for the outside transitions 66. The magnetic head 28 typically writes a signal which is around one track-width wide, considerably wider than either the inside transitions 64 or the outside transitions 66. The only way the servo bursts 62 can be written with such a head 28 is by erasing on each pass part of what was written in the previous pass. The track-centered gray code information 60 is written by matching the magnetization direction during consecutive passes of the magnetic head 28. This process of matching the magnetization of a previous pass to create a recorded magnetic transition which is wider than the width of the recording head is referred to as "stitching."

Figure 4A:
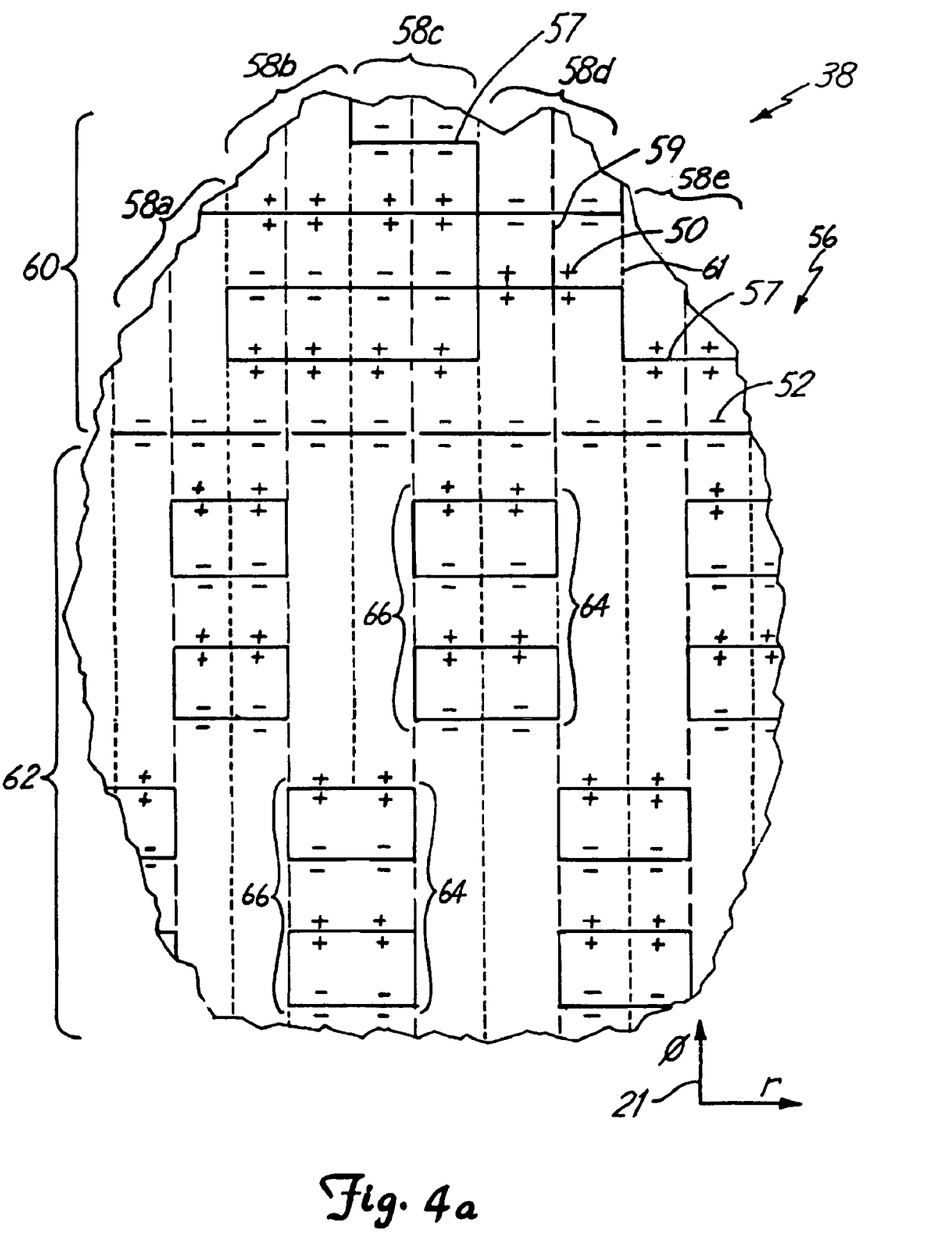
FIG. 4a is a greatly enlarged top plan view of an alternative servo pattern portion of the thin film magnetic disc.

FIG. 4a shows an alternative configuration for servo bursts 62. This configuration is quite similar to the configuration of FIG. 4, but the inside transitions 64 are reversed with the outside transitions 66 in every other track 58a, 58c, 58e. This servo burst configuration of FIG. 4a produces the strongest position error signal when the head is at a track boundary 61. The position error signal decreases monotonically as the head 28 approaches the center line 59, and becomes zeroed out when the head 28 is centered over the center line 59. Writing of the magnetic signals shown in FIG. 4a still requires two precisely positioned passes of the magnetic head 28 over each track 58: one for the inside transitions 64 and one for the outside transitions 66. The servo burst configuration of FIG. 4a may be preferable to the servo burst configuration of FIG. 4 due to the resultant position error signal. Workers skilled in the art will appreciate that either configuration of FIG. 4 or FIG. 4a may work suitably.

Figure 5:
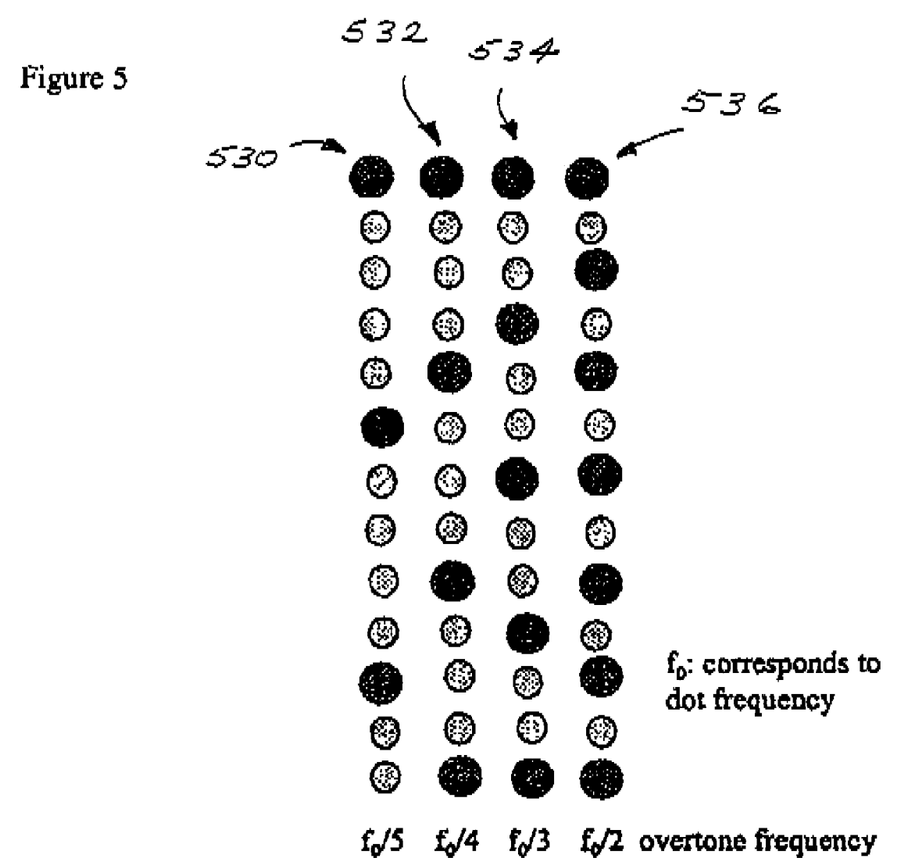
FIG. 5 illustrates a layout of the magnetic domains in accordance with the present invention modulated to create a dot-topology, wherein each track has a corresponding overtone frequency.

In accordance with one aspect of the present invention, the layout of the magnetic domains, i.e., dot-topology, can be used to align the head with the track and register its identification code. As illustrated in FIG. 5, each dot can be modulated to create a pattern or dot-topology 500. The modulation can be encoded in the size, height (i.e., thick or thin), or the magnetic properties (e.g., high or low) of the dot to create the pattern. For example, topology-dots 510 are illustrated in FIG. 5 as larger and darker than data-dots 520 and are thus easily differentiated.

FIG. 5 illustrates four tracks: track 530, track 532, track 534, and track 536. Each track has a corresponding overtone frequency which registers the track. For example, if $f_0$ is the dot frequency, track 536 has an overtone frequency of $f_0/2$, track 534 has an overtone frequency of $f_0/3$, track 532 has an overtone frequency of $f_0/4$, and track 530 has an overtone frequency of $f_0/5$. Further, it should be noted that timing can be recovered from dot-topology.

Figure 6:
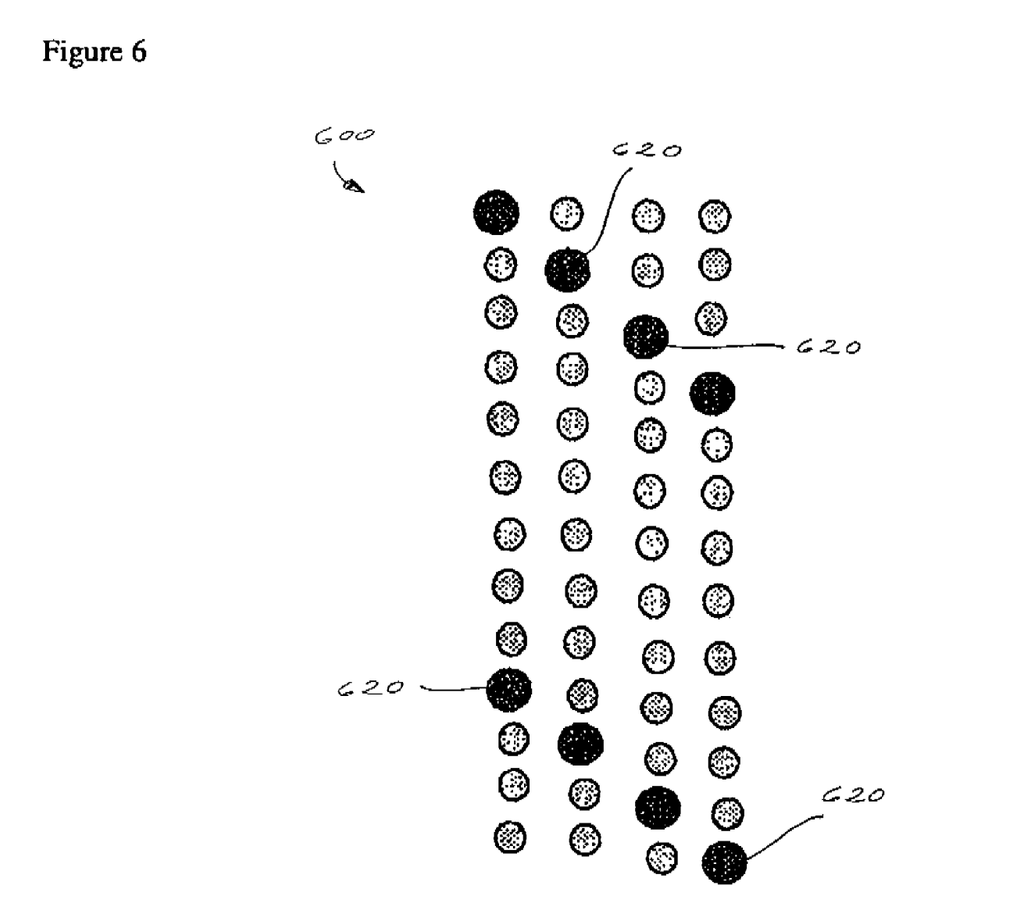
FIG. 6 illustrates a set of tracks in accordance with the present invention having a fundamental dot frequency on top of which an overtone having a lower frequency is generated.

The track-ID of each track can also be detected through the dot-topology by detecting the phase shift of each track in the dot-topology. FIG. 6 illustrates a set of tracks 600 having a fundamental dot frequency, $f_0$, on top of which an overtone having a lower frequency is generated. In FIG. 6, the overtone has a lower frequency of $f_0/9$. The modulated dots 620, illustrated as having a larger size and darker color, have a relative phase shift from track to track, thus enabling the detection of a relative track number. Proper initialization can be accomplished using a servo/timing field, as known in the art, which sets the clock for subsequent readings.

Figure 7:
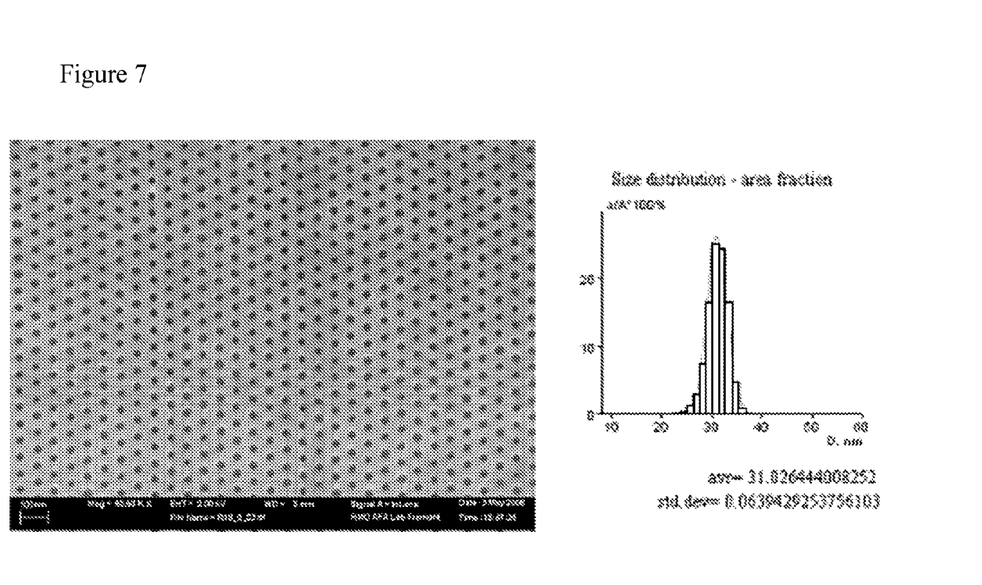
FIG. 7 is a microscope image of a set of tracks made in accordance with the present invention and a graph of the size and distribution of the dot topology.

The dot-topology (i.e., servo) writing process preferably produces tracks that form concentric circles about the center of rotation of the disk spindle. The tracks would also be spaced at a desired track pitch across the disk. Track pitch is defined as the distance between the centerlines of the track, and in an ideal recording disk the track pitch is equal between each individual track. FIG. 7 is a microscope image of a set of tracks and a graph of the size and distribution of the dot topology. Unfortunately, factors such as mechanical vibrations that are asynchronous to disk rotation during the servo writing process, along with disk defects and edge/transition noise cause the tracks to form irregular concentric paths and generate deviations in track pitch.

Figure 8:
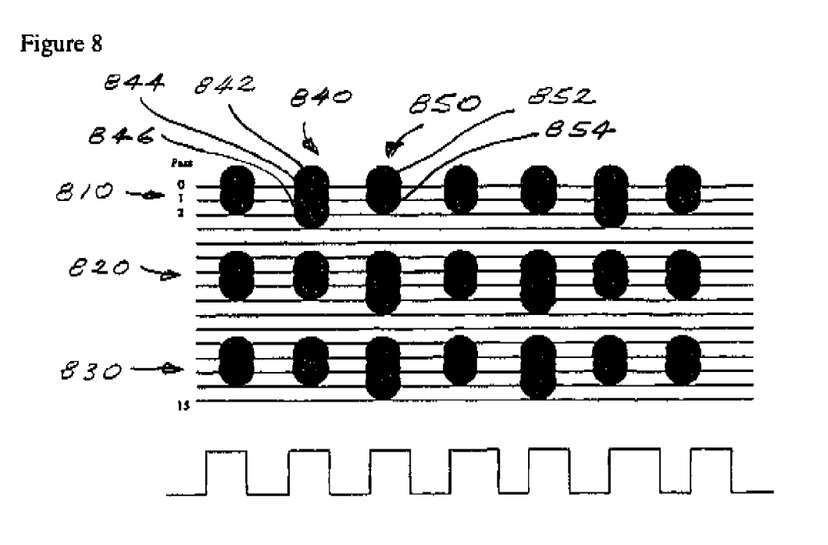
FIG. 8 illustrates a set of tracks made in accordance with the present invention using a multi-pass on/off control is used to modulate the dot size of specific dots.

An electron beam recording can be used to modulate the dot size during recording of the master pattern. In one embodiment, as illustrated in FIG. 8, a multi-pass on/off control is used to modulate the dot size of specific dots. FIG. 8 illustrates three tracks: track 810, track 820, and track 830. By controlling whether the electron beam is on or off during a pass of a spot, (e.g., FIG. 8 illustrates 15 passes), the size of the dot can be modulated.

By way of example and with reference to track 810, both large dots 840 and small dots 850 can be created. Large dot 840 is comprised of three overlapping dots which were created on successive passes of the electron beam. Dot 842 was created on pass 0, dot 844 was created on pass 1, and dot 846 was created on pass 2. In contrast, small dot 850 is only comprised of two dots—dot 852 and 854, which were created on pass 0 and pass 1, respectively, of the electron beam. Large dot 840 and small dot 850 have difference Hc (Hk) and thus can be distinguished. The pattern of large and small dots can be used to register and/or identify the track.

Figure 9:
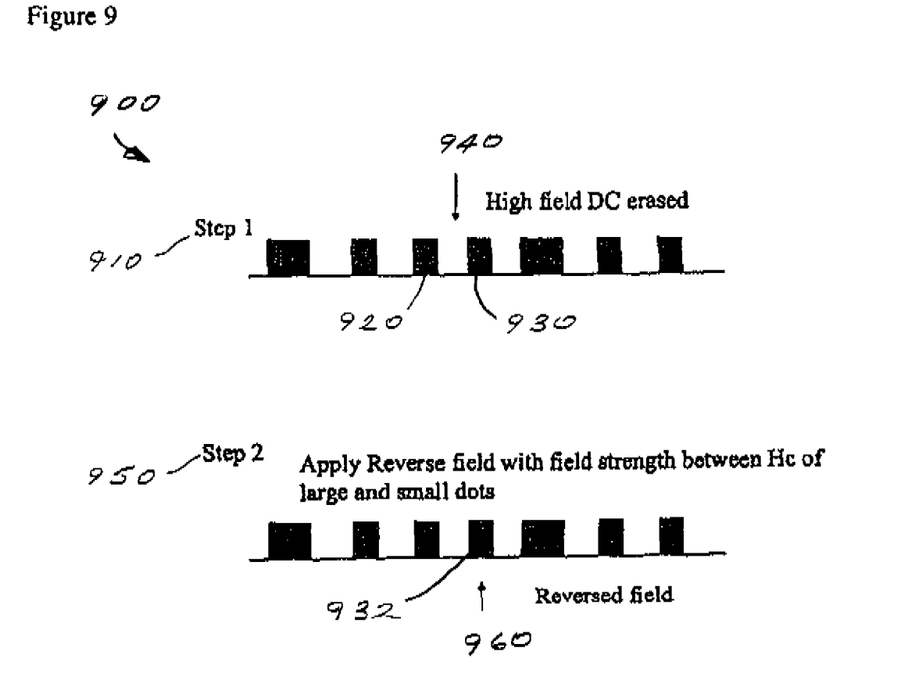
FIG. 9 illustrates a process in accordance with the present invention for controlling application of a magnetic field to control the dot size in accordance with the present invention.

In a further alternative, the dot size can be controlled by controlled application of a magnetic field, as illustrated by process 900 in FIG. 9. The first step 910 of the process 900 is to apply a high DC erase field, as in step 940 between dots (e.g., between dot 920 and 930). In the second step 950, a reverse field is applied 960, thus creating the modulated spot 932. The reverse field preferably has a field strength between that of the large and small dots. This technique can be used to control the shape, size, and magnetic properties of each dot.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage device, it will be appreciated by those skilled in the art that the teachings of the present invention can be applied to optical devices without departing from the scope and spirit of the present invention.

We claim:

1. A method, comprising:
   depositing a magnetic layer over a substrate;
   recording a master pattern in the magnetic layer on the substrate, the master pattern having a plurality of tracks, each comprising a plurality of discrete magnetic islands; and
   selectively applying a high DC erase field and a reversed field to modulate at least one of the size, shape and the magnetic properties of the plurality of the magnetic islands of each track such that each track has a modulation frequency and at least some of the plurality of discrete magnetic islands have different shape anisotropy in a plane of the substrate.

2. The method of claim 1, further comprising encoding a track ID in the magnetic islands of at least one of the tracks.

3. The method of claim 2, wherein the encoded track ID includes a phase shift of the modulation frequency.

4. The method of claim 1, comprising:
   depositing a magnetic layer over a substrate;
   recording a master pattern in the magnetic layer on the substrate, the master pattern having a plurality of tracks, and each track comprising a plurality of discrete magnetic islands;
   repeatedly writing with an electron beam a predetermined subset of magnetic islands a predetermined number of times, wherein each repetition of writing the predetermined subset of magnetic islands is shifted to provide a shape anisotropy of the magnetic islands in a plane of the substrate such that each track has a modulation frequency and at least some of the plurality of discrete magnetic islands have different shape anisotropy in a plane of the substrate.

5. The method of claim 4, further comprising encoding a track ID in the magnetic islands of at least one of the tracks.

6. The method of claim 5, wherein the encoded track ID includes a phase shift of the modulation frequency.

* * * * *